2,866,743

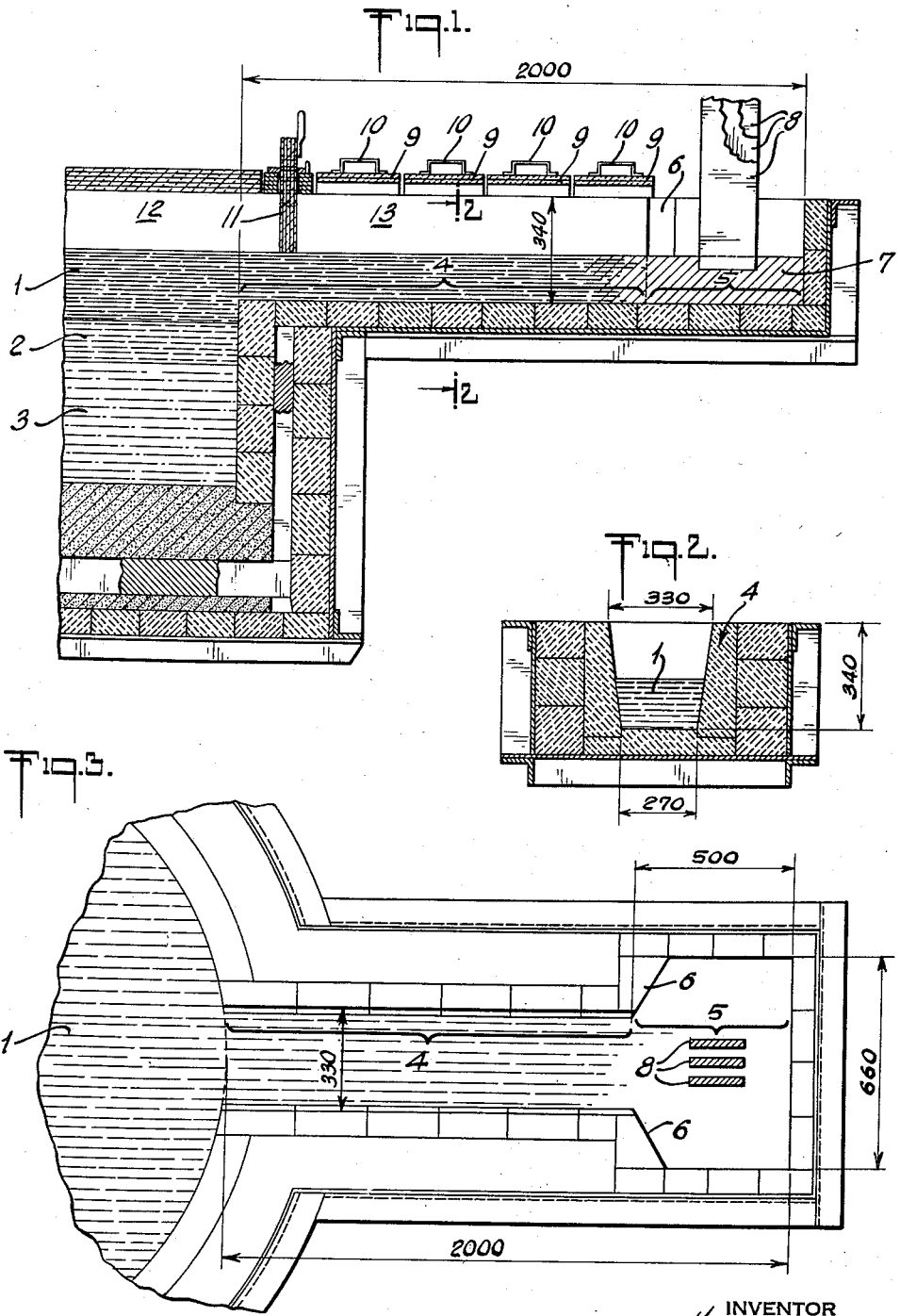

DEVICE FOR THE CURRENT SUPPLY TO THE CATHODIC LAYER IN THREE-LAYER ALUMINIUM REFINING CELLS

Hans Schmitt, Rheinfelden (Baden), Germany, assignor to Aluminium-Industrie-Aktien-Gesellschaft, Chippis, Switzerland, a Swiss joint-stock company Application December 27, 1956, Serial No. 630,830

Claims priority, application Switzerland December 30, 1955

1 Claim. (Cl. 204—243)

My present invention relates to aluminium refining cells operating according to the three-layer principle, in which cells the upper layer forms the cathode and consists in electrolytically recovered molten metal, the middle layer being the molten electrolyte and the lower layer the impure and alloyed molten anodic metal. With these cells it has often been tried to supply the electric current to the cathodic layer by means of a direct metallic contact between the bus bars and the molten cathodic metal instead of using electrodes made from artificial carbon or graphite dipped into the cathodic layer. Such a "molten metal connection" would enable to spare the consumable carbon or graphite electrodes and to obtain a voltage gain because of the suppression of the voltage drop in the electrodes.

For the first molten metal connection a channel provided with a brick lining or made from a rammed carbonaceous material and having generally a uniform cross-section on its whole length was disposed radially to the cell wall at the height of the upper cathodic layer so that it was filled with molten cathodic metal, the solid current conductors supplying current to the cathode dipping into the channel end opposite to the cell. Of course, one may use several channels on one cell. These channels are open towards the cell and closed at the other end; they are either covered or uncovered. This first example of execution of the molten metal connection has not proved satisfactory. The channels showed soon on the inner side walls and on the bottom accretions of oxides, slags and portions of freezed electrolyte, accretions which grew very quickly so that the metallic connections were useless after a very short service. As soon as the cross-section of the current conducting molten layer in the channel reaches a certain lowest value because of the growing of the accretions, the magnetic forces which act upon the metallic conductor and cause a contraction of the same become so great that they cut off suddenly the metalic vein, molten metal being thrown explosively out of the channel, and thereby interrupt the electric current, causing violent electric arcs. It is known that the critical cross-section causing this contraction (pinch effect) depends on the intensity of current in the molten metal vein and on the density of the molten metal.

One has tried to get this phenomenon under control by meals of a special shape of the channel. One made it for instance trapezoidal and as deep as possible, the channel being narrower on the bottom than on the top. In the same measure as the accretions grew during the operation of the refining cell one raised the level of the cathodic metal; in this way the cross-section of the channel remained above its critical value. But the time of operation of a channel of this kind was limited. As soon as the metal level reached the upper edge of the channel it was necessary to disconnect the latter. It could be put again into operation only after removal of the slag and renewal of the lining.

In another attempt to get the pinch effect under control by means of a special shape of the channel the latter was subdivided in its length in such a way that the inner part of the channel, that is to say the part facing the inside of the cell, had a smaller cross-section than the outer part of the channel (the part opposite to the cell), into which the metallic conductors are dipped. The cross-sectional size of the inner part of the channel was such that the cross-section of the molten metal was closely above the critical value whereas the cross-section of the outer part was so great than the metal vein in it had a substantially greater cross-section. The influence of the electromagnetic forces remained actually limited to the channel entrance facing the inside of the cell. The metal flows caused by the electromagnetic forces and the electrolyte portions and oxides carried along with the metal flows do not penetrate far into the channel as in the usual channels; the zone in which the molten metal in the channel and the solid current conductors are in contact remains substantially free from metal whirlpools and from incrustations and the growing of the accretions in the channel is much slower.

In this way, one succeeds in making metallic connections which enable to operate during a certain time refining cells having only molten metal connections (without graphite electrodes) without disturbance because of pinch effect in the channels. But it was soon found that these cells do not allow the expected voltage gain and must be operated at voltages which are considerably higher than cells with graphite electrodes. It appears that great heat losses take place in the channels through heat radiation, convection or conduction. These losses may be reduced by providing the channels with heat insulating covers; but they remain so great that it is not possible, even by operating the cell with a higher voltage, to maintain in the inside of the cell the temperature which is favorable for the electrolytic process. As the covers must be often removed for cleaning the channels it is also impossible to maintain the temperature constant in the cell.

Moreover, in the cells of the elder construction important heat losses in the channels were unavoidable, as the temperature of the metal in the channel had to be maintained as low as possible because it was necessary that the metal at the outer end of the channels remained frozen where the solid bus bars dipped into the channel. If the metal became molten at this outer end, there was the danger that the end of the solid metallic conductors, e. g. bus bars, became molten too, interrupting thereby the connection between the solid and the molten conductor. Besides the electromagnetic phenomena the maintenance of a low temperature was a further cause for the deposition of portions of frozen electrolyte, slag particles and oxides preferably in the channels, so that the latter became obstructed after a certain lapse of time notwithstanding their special shape.

As a consequence of these troubles the principle of the molten metallic connection has not been applied in an industrial scale to the electrolytic refining of aluminium up to now, in spite of the advantages which were expected as to the saving of electrodes and to the voltage gain.

After a long development work and systematic researches and trials in operating industrial cells I invented a satisfactory manner of making the molten metal connection and of avoiding the mentioned troubles.

My invention is substantially a combination of three features relating to the cross-section of the channel, to the use of a channel covering together with a slide gate for reducing the heat losses through convection in the channel and to the enlarging of the channel width at the end opposite to the cell.

For carrying out my invention it is necessary that the electrolytic cells which should be equipped with the molten metal connection according to my present invention be provided with a heat insulating covering reducing substantially the heat losses through the upper surface of the cells.

The cross-section of the connecting channel must be of such a size that the cross-section of the molten metal in it be always over the critical value at which the contraction of the metallic vein through the pinch effect takes place.

The critical cross-section of the metallic vein in the connecting channel may be calculated according to the following equation:

$$Q = 1.17 \times 10^{-3} \frac{J^{4/3}}{S^{2/3}} \text{ cm.}^2$$

wherein
$Q$ = critical metallic cross-section in cm.² (square centimeters)
$J$ = current intensity in the metallic vein in amperes
$S$ = specific weight of the molten metal The channels are closed on the top by a removable, adjustable and heat insulating cover which is connected directly to the heat insulating hood of the cell. The cover is made divisible or constructed like a rolling shutter. It may be removed piece by piece or rolled up beginning at the outer channel end in direction of the middle of the cell, so that the channel can be uncovered to any extent. Furthermore the channel is equipped at the entrance to the inside of the cell with a regulating slide gate; by means of this gate it is possible to separate in a great extent the atmosphere over the cell from the atmosphere over the channel. The gate is preferably operated from the outside over the channel covering and may be regulated in such a way that it touches in its lowest position the metal level and liberates in its upper position the atmosphere between the channel covering and the metal level, any intermediate position being possible.

A further feature of my present invention is at last a great and abrupt enlargement of the channel at its outer end, where the solid metallic conductors dip into the channel. This enlargement of the channel should be preferably very sudden and so great that the width of the channel at the end amounts to 1.5 to 4 times, preferably 2 times the average smaller channel width. The length of the outer channel end portion should amount to 1 to 3 times, preferably to 1.5 times the average smaller channel width. The result is that the metal remains always frozen in the enlarged part of the channel end because of the great cooling metal mass there, and the ends of the solid metallic conductors dipping there into the channel are always surrounded by solidified metal, so that there is no danger that they melt, even if the temperature of the molten metal in the channel reaches its highest value.

During the investigations and trials I made the surprising discovery that the heat losses of the cell are caused to a great extent by convection and less by conduction from the molten metal through the metallic connections to the outer conductors and by heat radiation, as it was thought previously. Moreover I found that there is an important abrupt temperature drop between the molten metal in the channel and the solidified metal in the enlargement at the outer channel end, so that one may believe that the transition zone from the molten to the solid metal be a zone of relatively low heat conductivity. This phenomenon makes it possible to adjust the temperature of the molten metal in the channel in a certain measure independently of the temperature of the solid metal block at the outer end of the channel.

By means of the heat insulated slide gate at the entrance of the channel as well as by means of the regulable channel covering the heat losses in the cell can be regulated in a great measure at will and, if necessary, reduced to a minimum, so that the temperature in the inside of the cell can be kept under control. Even when the slide gate is fully closed and the channel covered on its whole length, that is to say when the temperature in the inside of the cell is regulated to its highest value, and therefore also the temperature in the channel is highest, no melting of the metal block in the enlargement at the outer end of the channel takes place if the conditions mentioned above for the size of the outer end of the channel are fulfilled. The boundary between the solidified and the molten metal remains always nearly at the passage from the narrow part of the channel to the enlarged part at the outer channel end independently of the height of the temperature in the channel; the surface at which solidified metal and molten metal are in contact is always rather vertical, so that the level of the metal in the cell and in the channel may be regulated to a certain extent without danger according to the necessities of the service.

The heat losses are the lowest when the slide gate and the channel covering are closed; it is therefore possible to operate the cell with lowest voltage. According to the necessities of the electrolytic process the temperature in the cell can be regulated at will by opening more or less the slide gate and the channel covering.

In any case, even when the slide gate and the channel covering are partially open the heat losses in the cells with molten metal connections according to the present invention are lower than with molten metal connections of known shapes; the temperature in the narrow part of the channels is higher than in the known ones. Therefore it is possible to operate these cells with very low voltage; that is to say that it is possible to obtain the expected voltage gain because of the suppression of the graphite electrodes; moreover the growing of the accretions in the channels is slowed down very much and their time of operation increased by many times, so that the molten metal connections according to my present invention fulfill all conditions of service.

A device in accordance with my present invention is shown in the accompanying drawings. In these drawings, Fig. 1 is a vertical section through a part of an aluminium refining cell with the cathodic layer 1 of purest aluminium, the middle layer 2 of electrolyte and the lowest layer 3 of anodic alloy, as well as a section through a connecting channel according to my present invention;

Fig. 2 is a vertical section along the line 2—2 of Fig. 1, the channel covering and some other parts of the refining cell being not shown;

Fig. 3 is a top plan view of the part of the cell and the connecting channel according to Fig. 1, the channel covering and some other parts of the refining cell being also not shown.

It is not believed to be necessary to describe the construction of the cell in detail, as the construction is well known. The example relates to a refining cell of 20,000 amperes provided with two connecting channels according to my present invention, so that each channel is calculated for a current intensity of 10,000 amperes.

The narrow part 4 of the channel, as it is shown in Fig. 2 in cross-section, has a sole 27 cm. wide and on the top a width of 33 cm. between the inner walls. The height between the channel sole and the edge of the side walls is 34 cm. The narrow part of the channel is 150 cm. long. The end of the channel part opposite to the cell goes suddenly over to the enlarged part 5, the width of which is 66 cm. and therefore twice the width of the part 4 between the upper edge. The length of the part 5 from the beginning of the enlargement is about 50 cm.; the length of the part 5 is therefore about 1.5 times the width of part 4. The walls 6 of the channel form an angle of about 125° C. with the side walls of the channel parts 4 and 5. The angle may be greater or smaller, but the transition between part 4 and part 5 must be sharp. The molten portion of the cathodic metal layer is indicated by horizontal lines, whereas the solidified portion 7 is indicated by oblique lines. This solidified portion is in intimate contact with the three vertical aluminium bus bars 8; it is suitable to dip the bus bars into the layer 7 before it is solidified.

The cross-section of the metal vein, as it is shown in Fig. 2 must be greater than the cross-section at which a contraction through pinch effect takes place. In the present example the cross-section of the metal vein amounts to about 220 square centimeters when the cell is operated with a lowest height of 8 centimeters of the metal in the channel. The cross-section of the metal vein lies therefore far enough over the critical cross-section. With a current intensity of 10,000 amperes and a specific gravity of 2.4 of the molten aluminium the critical cross-section is 141 square centimeters according to the mentioned equation. On its narrow part the channel is provided with removable heat insulating covers 9. 10 are handles, 11 is a heat insulated slide gate, which can be regulated in height and is nearly in contact with the surface of the cathodic layer in the position shown in Fig. 1. This slide gate separates the atmosphere 12 over the cell from the atmosphere 13 over the channel and hinders heat losses through convection.

Although II have referred to specific and detailed embodiments of my invention, it is to be understood that such references were for descriptive purposes only and do not limit the scope of my invention as defined by the subjoined claim.

What I claim is:

1. An electrolytic device for refining aluminum according to the three-layer process in which a layer of molten metal floats on the electrolyte to serve as an electrode, comprising a cell, a channel extending from said cell at the inner end of said channel where said channel communicates with said cell and adapted to receive a portion of said layer of molten metal to form a metal vein therein, conductive means extending into the outer end of said channel, said channel being of such size that the cross-sectional area of the metal vein therein is at least as great as the critical cross-sectional area at which contraction through pinching effect takes place, this critical cross-sectional area being calculated as follows:

$$Q = 1.17 \times 10^{-3} \frac{J^{4/3}}{S^{2/3}} \text{ cm.}^2$$

wherein Q is the critical cross-sectional area, J is the current intensity in the metallic vein in amperes and S is the specific weight of the molten metal, said channel being abruptly enlarged at its outer end section, the conductive means being adapted to dip into the metal layer in the enlarged channel section, the width of the enlarged channel section of the channel being 1.5 to 4 times the width of the section of the channel prior to its enlargement, and the length of said enlarged section of the channel being 1 to 3 times the width of the section of the channel prior to its enlargement, a regulable heat insulating cover for that part of said channel up to the region near the enlarged section of the channel spaced above the level of the molten metal in the channel to form a gap between the molten metal in said channel and said cover, and a regulable slide gate near the inner end of said channel interrupting said gap and reaching at its lowest position near the surface of the molten metal in said channel.

References Cited in the file of this patent
UNITED STATES PATENTS

| | | |
|---|---|---|
| 2,584,565 | Ferrand | Feb. 5, 1952 |
| 2,685,566 | Schmitt | Aug. 3, 1954 |